US006982022B2

(12) United States Patent
Clark et al.

(10) Patent No.: US 6,982,022 B2
(45) Date of Patent: Jan. 3, 2006

(54) FORMATION OF PHOTOPATTERNED INK JET NOZZLE PLATES BY TRANSFER METHODS

(75) Inventors: Shan Clark, Forest Grove, OR (US); Gary Kneezel, Webster, NY (US); Ram Narang, Macedon, NY (US); Bidan Zhang, Lagrandeville, NY (US); Almon Fisher, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 135 days.

(21) Appl. No.: 10/442,543

(22) Filed: May 21, 2003

(65) Prior Publication Data

US 2004/0231780 A1 Nov. 25, 2004

(51) Int. Cl.
*B32B 31/00* (2006.01)
*B41J 2/16* (2006.01)
*G03C 5/00* (2006.01)

(52) U.S. Cl. ...................... 156/230; 156/235; 156/241; 156/272.2; 427/146; 347/40; 347/56; 430/270.1; 430/311; 430/312

(58) Field of Classification Search ........ 156/230–235, 156/239–241, 247, 289, 272.2, 273.3, 273.5, 156/275.5; 427/96, 146–148; 347/40, 56, 347/65; 430/267, 269, 270.1, 311, 312, 319, 430/320
See application file for complete search history.

(56) References Cited

U.S. PATENT DOCUMENTS 4,624,912 A * 11/1986 Zweifel et al. ............. 430/258
4,774,530 A * 9/1988 Hawkins ...................... 347/63
5,208,605 A * 5/1993 Drake ........................ 347/15
5,578,417 A * 11/1996 Noguchi et al. ......... 430/280.1
5,859,655 A * 1/1999 Gelorme et al. .............. 347/65
6,120,693 A * 9/2000 Petti et al. .................... 216/18

OTHER PUBLICATIONS

Anonymous, IBM Technical Disclosure Bulletin, Nonmetallic Nozzle Plate Assembly for Thermal Ink Jet Printheads, vol. 34, Num. 7B, Dec. 1, 1991.*

* cited by examiner

*Primary Examiner*—Sue A. Purvis
(74) *Attorney, Agent, or Firm*—Perman & Green, LLP

(57) ABSTRACT

Disclosed is a process for forming a novel ink jet printhead which comprises: (a) providing a lower substrate in which one surface thereof has an array of drop generating elements and addressing electrodes formed thereon; (b) depositing onto the release surface of an intermediate film support a photopatternable layer comprising a precursor polymer which is a phenolic novolac resin having glycidyl ether functional groups; (c) prebaking the photopatternable layer to dry, semi-solid condition; (d) laminating the dry, semi-solid layer to the surface of the lower substrate under heat and pressure and separating it from the release surface of the intermediate film support; (e) exposing the photopatternable layer to actinic radiation in an imagewise pattern corresponding to ink nozzles and developing to form a nozzle plate section, and (f) removing the precursor polymer from the unexposed areas, thereby forming ink nozzle recesses which are aligned to communicate with the drop generating elements and terminal ends of the electrodes of the lower substrate laminated thereto. Step (e) may be carried out either before or after step (d).

9 Claims, 4 Drawing Sheets

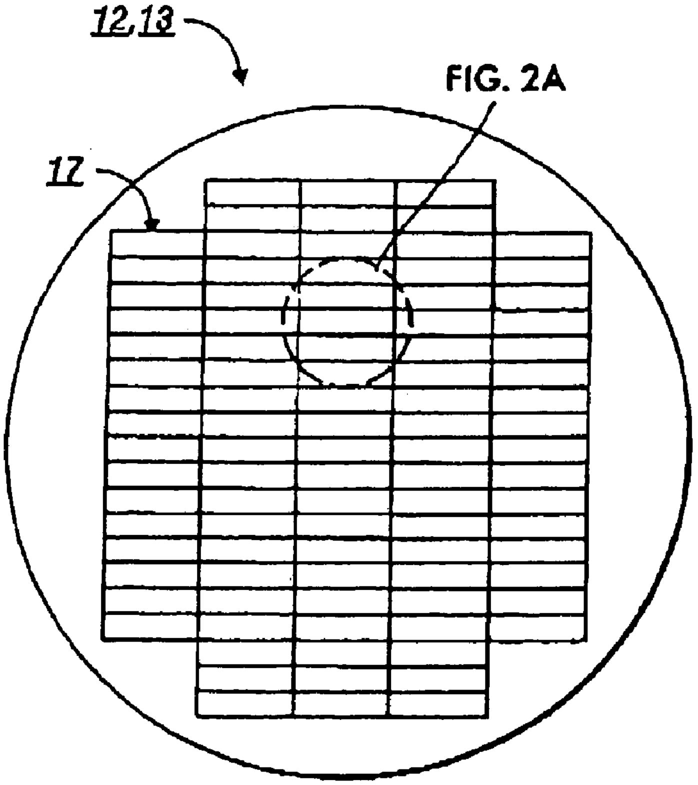
FIG. 2
FIG. 2A
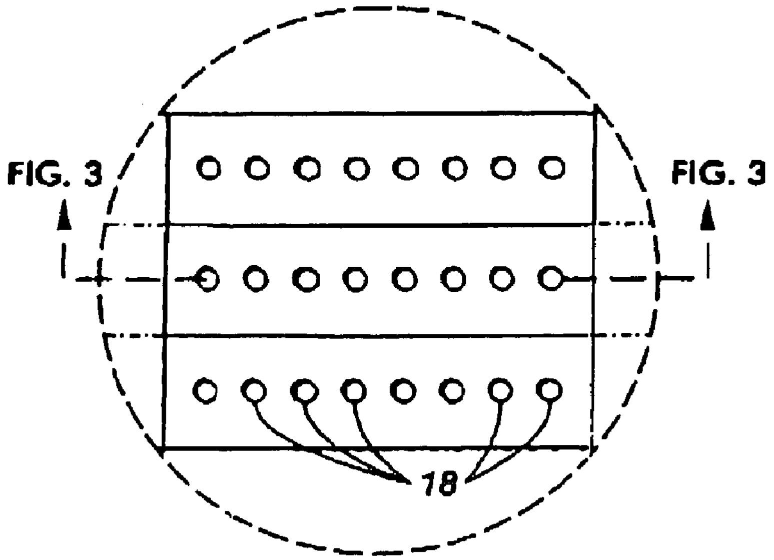

FORMATION OF PHOTOPATTERNED INK JET NOZZLE PLATES BY TRANSFER METHODS

BACKGROUND OF THE INVENTION

1. Field of the Invention

This invention relates to ink jet printing devices and more particularly to a thermal ink jet or Microelectromechanical Systems (MEMS) printhead having an array of coplanar nozzles in a nozzle face that are entirely surrounded by an insulative polymeric material, together with a method of fabrication thereof.

Thermal ink jet printing is a type of drop-on-demand ink jet system wherein an ink jet printhead expels ink droplets on demand by the selective application of a current pulse to a thermal energy generator, usually a resistor, located in capillary-filled parallel ink channels a predetermined distance upstream from the channel nozzles or orifices. The channels' ends opposite the nozzles are in communication with an ink reservoir to which an external ink supply is connected. The current pulses momentarily vaporize the ink and form bubbles on demand. Each temporary bubble expels an ink droplet and propels it towards a recording medium. The printing system may be incorporated in either a carriage-type printer or pagewidth type printer. A carriage-type printer generally has a relatively small printhead containing the ink channels and nozzles. The printhead is usually sealingly attached to a disposable ink supply cartridge in a combined printhead and cartridge assembly which is reciprocated to print one swath of information at a time on a stationarily held recording medium such as paper. After the swath is printed, the paper is stepped a distance equal to the height of the printed swath so that the next printed swath will be contiguous therewith. The procedure is repeated until the entire page is printed. In contrast, the pagewidth printer has a stationary printhead having a length equal to or greater than the width of the paper. The paper is continually moved past the printhead in a direction normal to the printhead length and at a constant speed during the printing process.

U.S. Pat. No. Re. 32,572 to Hawkins et al discloses a thermal ink jet printhead and method of fabrication. In this case, a plurality of printheads may be concurrently fabricated by forming a plurality of sets of heating elements with their individual addressing electrodes on one substrate, generally a silicon wafer, and etching corresponding sets of channel grooves with a common recess for each set of grooves in another silicon wafer. The wafer and substrate are aligned and bonded together so that each channel has a heating element. The individual printheads are obtained by milling away the unwanted silicon material to expose the addressing electrode terminals and then dicing the substrate to form separate printheads. This type of thermal ink jet printhead, where the direction of fluid ejection is substantially parallel to the plane of the wafer is sometimes called a sideshooter. A second generic type of ink jet printhead, called a roofshooter, has the direction of fluid ejection substantially perpendicular to the plane of the wafer. It is such roofshooter printheads that this invention applies to.

In microelectronics applications, there is a great need for low dielectric constant, high glass transition temperature, thermally stable, photopatternable polymers for use as interlayer dielectric layers which protect microelectronic circuitry. Poly(imides) are widely used to satisfy these needs; these materials, however, have disadvantageous characteristics such as relatively high water sorption and hydrolytic instability. There is thus a need for high performance polymers which can be effectively photopatterned and developed at high resolution.

Particular applications for such material include the fabrication of ink jet printheads as disclosed in related U.S. Pat. Nos. 5,762,812 and 6,260,956, the disclosures of which are incorporated herein. Ink jet printing systems generally are of two types: continuous stream and drop-on-demand. In continuous stream ink jet systems, ink is emitted in a continuous stream under pressure through at least one orifice or nozzle. The stream is perturbed, causing it to break up into droplets at a fixed distance from the orifice. At the break-up point, the droplets are charged in accordance with digital data signals and passed through an electrostatic field which adjusts the trajectory of each droplet in order to direct it to a gutter for recirculation or a specific location on a recording medium. In drop-on-demand systems, a droplet is expelled from an orifice directly to a position on a recording medium in accordance with digital data signals. A droplet is not formed or expelled unless it is to be placed on the recording medium.

Since drop-on-demand systems require no ink recovery, charging, or deflection, the system is much simpler than the continuous stream type. One type of drop-on-demand system is known as thermal ink jet, or bubble jet, and produces high velocity droplets and allows very close spacing of nozzles. The major components of this type of drop-on-demand system are an ink filled channel having a nozzle on one end and a heat generating resistor near the nozzle. Printing signals representing digital information originate an electric current pulse in a resistive layer within each ink passageway near the orifice or nozzle, causing the ink in the immediate vicinity to evaporate almost instantaneously and create a bubble. The ink at the orifice is forced out as a propelled droplet as the bubble expands. When the hydrodynamic motion of the ink stops, the process is ready to start all over again. With the introduction of a droplet ejection system based upon thermally generated bubbles, commonly referred to as the "bubble jet" system, the drop-on-demand ink jet printers provide simpler, lower cost devices than their continuous stream counterparts and yet have substantially the same high speed printing capability.

The operating sequence of the bubble jet system begins with a current pulse through the resistive layer in the ink filled channel, the resistive layer being in close proximity to the orifice or nozzle for that channel. Heat is transferred from the resistor to the ink. The ink becomes superheated far above its normal boiling point, and for water based ink, finally reaches the critical temperature for bubble formation or nucleation of around 280° C. Once nucleated, the bubble or water vapor thermally isolates the ink from the heater and no further heat can be applied to the ink. This bubble expands until all the heat stored in the ink in excess of the normal boiling point diffuses away or is used to convert liquid to vapor, which removes heat due to heat of vaporization. The expansion of the bubble forces a droplet of ink out of the nozzle, and once the excess heat is removed, the bubble collapses on the resistor. At this point, the resistor is no longer being heated because the current pulse has passed and, concurrently with the bubble collapse, the droplet is propelled at a high rate of speed in a direction towards a recording medium. The resistive layer encounters a severe cavitational force by the collapse of the bubble, which tends to erode it. Subsequently, the ink channel refills by capillary action. This entire bubble formation and collapse sequence occurs in about 10 microseconds. The channel can be refired after about 20 to 500 microseconds minimum dwell time to enable the channel to refilled and to enable the dynamic refilling factors to become somewhat dampened. Thermal ink jet processes are well known.

In ink jet printing, a printhead nozzleplate is provided having one or more ink-filled channels communicating with an ink supply chamber at one end and having an opening at the opposite end, referred to as a nozzle. These printheads form images on a recording medium such as paper by expelling droplets of ink from the nozzles onto the recording medium. The ink forms a meniscus at each nozzle prior to being expelled in the form of a droplet. After a droplet is expelled, additional ink surges to the nozzle to reform the meniscus.

Roofshooting ink jet printheads include a nozzleplate having an array of nozzles. This nozzle plate may be bonded to a silicon wafer, for example, which contains the bubble nucleating heater elements In U.S. Pat. No. 6,260,956 it has been proposed to use a polyarylene ether precursor polymer, which is photopatternable, to form the insulating layer over the heater plate, followed by photopatterning to expose the heating elements. The channel plate is prepared from the same photopatternable polymer and is then bonded to the heater plate using a thin bonding layer of the same polymer. This may be accomplished by indirect means in order to prevent the bonding layer from flowing onto the channel walls and along the apex of each channel, causing formation of a thin film along the channel walls and a bead along each apex.

It is desirable to provide a method for forming thermal ink jet nozzleplates by which a photopatternable resist layer can be applied to the patterned surface of an activator wafer, without disturbing said surface, and can be photopatterned to form ink nozzles having shapes which produce improved ejection velocity.

It is also desirable to provide a method for forming nozzleplates containing an ink cavity gap over a MEMS structure surface containing topography

SUMMARY OF THE INVENTION

The present invention provides a novel lamination process for forming nozzle plates comprising fluidic ink passageways in actuator wafers, such as MEMS print heads containing silicon membranes which eject the ink through electrostatically-induced mechanical forces, without the need for planarization and sacrificial layers to prevent penetration of a fluid photoresist composition into the MEMS structure.

The present invention also enables the formation of an air gap separation between the MEMS surface and the nozzle layer, producing an ink reservoir to increase fluid flow and less flow resistance into the ink channels and nozzles.

This invention also enables the formation of novel nozzle geometries or cross-sections which are layered or constricted at the nozzle exit to provide increased ejection velocity.

According to the present invention novel nozzle plates are produced by spin coating a photopatternable curable resist layer of an epoxy novalak polymer onto an intermediate support having release properties; soft-baking the epoxy resist layer to a dry semi-solid adhesive condition; laminating the surface of the dry resist to the surface of a silicon wafer containing drop generating structures; separating the wafer from the coated intermediate support to cause the contacting portion of the adhesive resist layer to remain laminated to the wafer surface and transfer from the intermediate support while other portions of the resist layer, including peripheral edge bead portions thereof are retained on the intermediate support. The photoresist epoxy novolak polymer layer is photoexposed and patterned, either through the intermediate support if it is translucent, before lamination and transfer to the wafer surface, or after lamination and transfer onto the wafer surface.

BRIEF DESCRIPTION OF THE DRAWINGS

FIG. 2 is a face view of a photoexposed, processed resist layer as in FIG. 1 forming an ink nozzle layer over the drop generator surface of an actuator wafer. In this figure, each row of nozzles corresponds to a different one of the plurality of die on the wafer;

DETAILED DESCRIPTION

Figure 1:
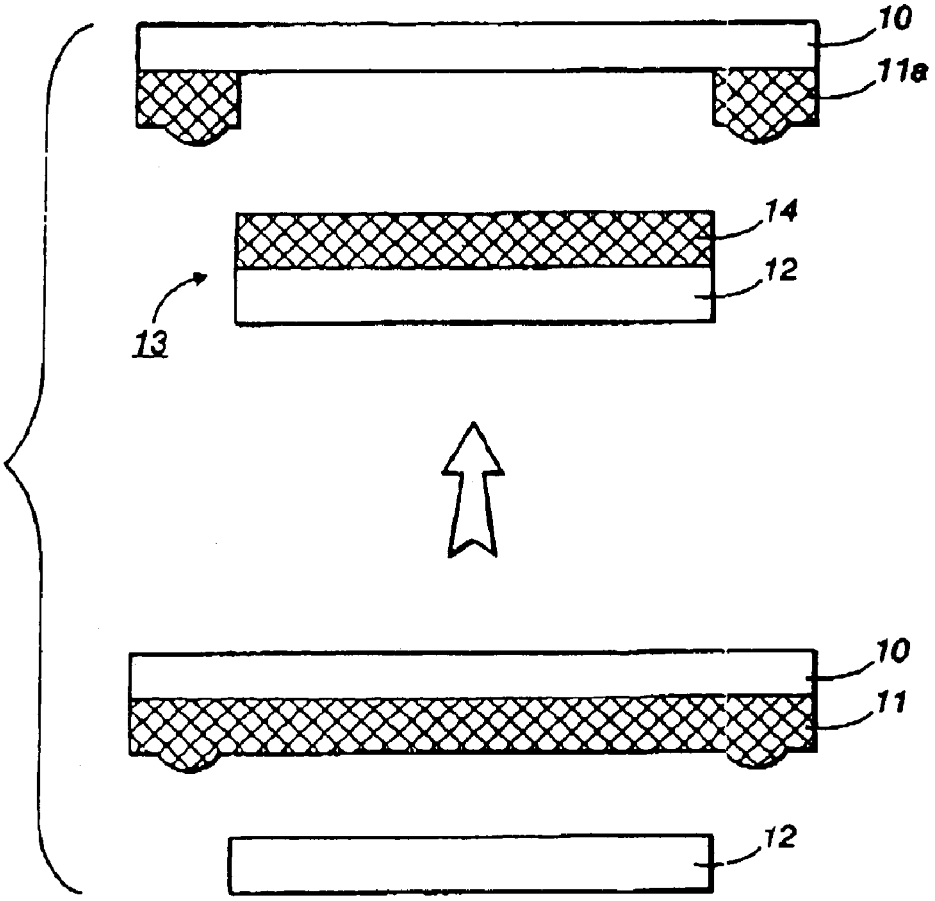
FIG. 1 is a cross-sectional view, to an enlarged scale, illustrating the lamination and transfer of a uniform thickness of a soft-baked, semi-solid photopatternable epoxy novolak polymer resist layer from an intermediate release film to the surface of an actuator wafer containing a plurality of actuator.

Referring to FIG. 1, a flexible, translucent release substrate, such as a 1-2 mil Mylar film disk 10 is spin coated on one surface with a layer 11 of a photopatternable epoxy novolak polymer composition and soft baked to a dry semi-solid adhesive condition.

Next, a silicon actuator wafer, having a smaller diameter than the resist-coated Mylar disk, is centered and laminated to the dry resist layer 11 under heat and pressure. After cooling the Mylar disk is peeled away, transferring a level portion 14 of the resist layer to the silicon wafer 12 while retaining peripheral bead portions 11*a* of layer 11 on the Mylar disk, which portions are beyond the area against which the wafer surface was pressed. Thus, the undesirable edge bead 11*a* is left on the Mylar substrate leaving a topographically perfect and level photoresist layer 14 on the silicon actuator wafer substrate 12.

In the next step, the photoresist layer 14 is photoexposed and developed to convert it to an ink nozzle layer 17, using a mask to form a desired plurality of clean, defect-free passages which are somewhat semi-parabolic in cross-sectional shape and have a narrower opening 18 at the surface of the layer 17, tapering out to a wider opening 19 at the surface of the actuator wafer 12, to form an integral actuator wafer 16 having discharge nozzles 20 which are constricted in diameter and provide increased ink-ejection velocity.

Figure 3:
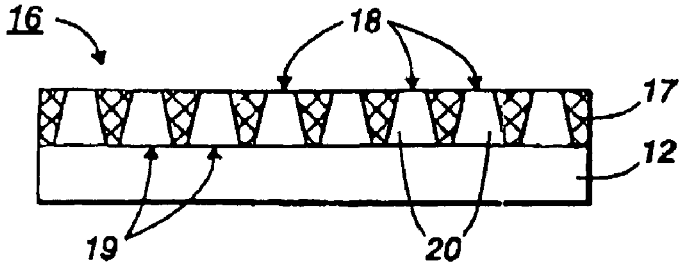
FIG. 3 is a cross-sectional view of FIG. 2 taken along the line 3—3 thereof, illustrating the constricted cross-sectional area of the ink-discharge nozzle.
Figure 4:
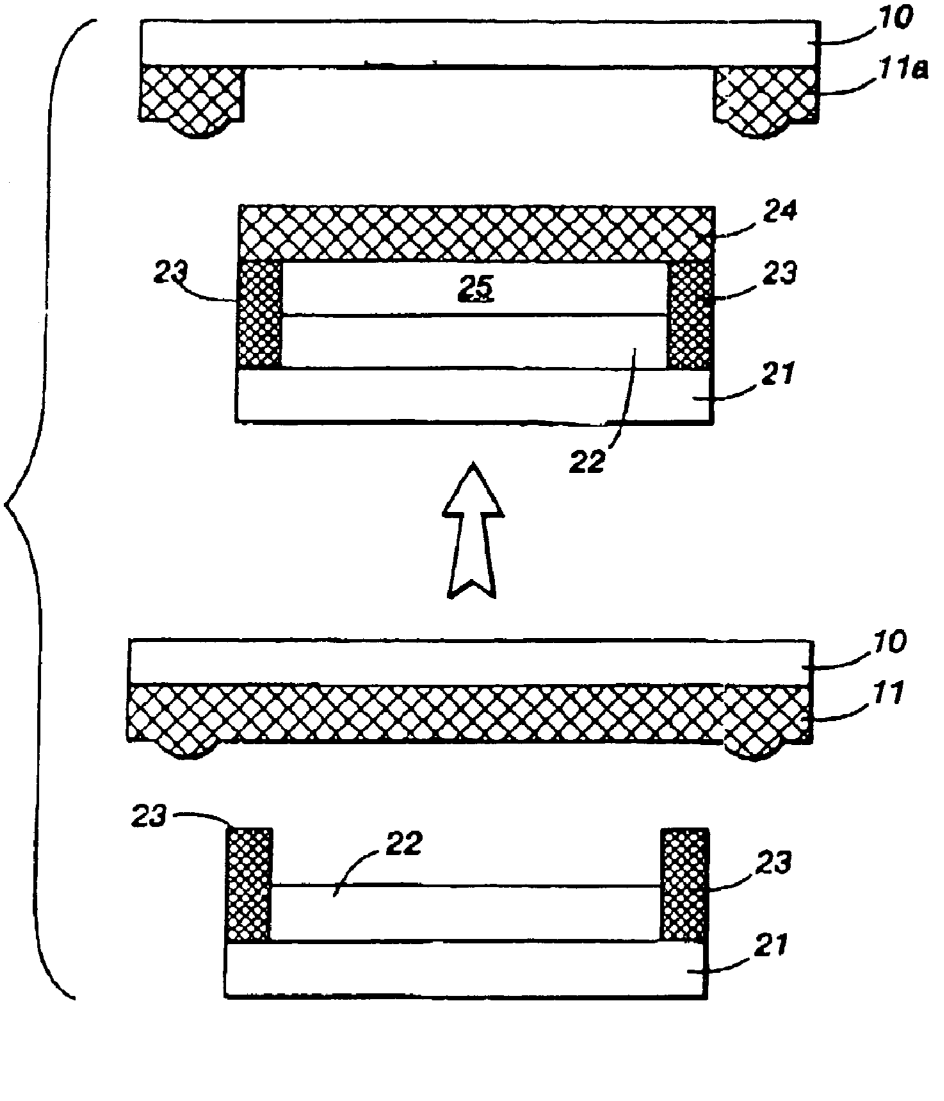
FIG. 4 is a cross-sectional view, to an enlarged scale, illustrating the lamination and transfer of a soft-baked, semi-solid photopatternable epoxy novolak polymer resist layer from an intermediate resist film to the surface of a MEMS wafer containing topography, inherently producing an intermediate ink reservoir area.
Figure 5:
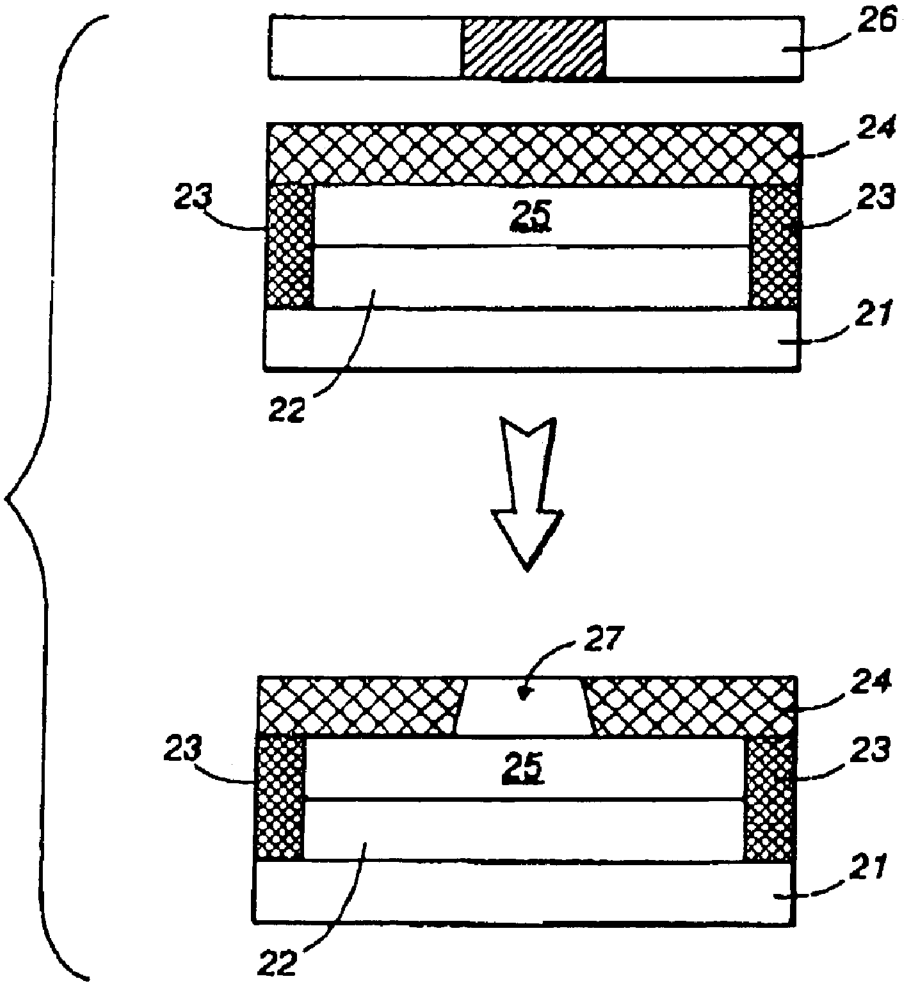
FIG. 5 is a cross-sectional view of the MEMS wafer formed according to claim 4 being photoexposed through a mask and developed to form an ink nozzle in the resist layer.

Referring to FIGS. 4 and 5, the silicon wafer thereof is a MEMS wafer 21 having a microelectromechanical surface area 22 surrounded by a peripheral topography wall 23. It is not possible to coat a MEMS surface with a liquid resist layer since the liquid resist would flow into and contaminate the MEMS moving parts and/or fluidic passageways. The dry film resist layer is separated from the MEMS layer using elevated topography or peripheral walls 23. The solid transfer of level resist layer 24 to the peripheral walls 23 of the MEMS wafer inherently produces an ink reservoir 25 over the MEMS layer 22, as illustrated by FIG. 3.

Solid transfer of the level resist layer 24 is accomplished as discussed hereinbefore in connection with FIG. 1. Thus Mylar disk 10 is spin-coated with the photosensitive epoxy novolak resist composition and soft baked to a dry semi-solid composition. The MEMS wafer is pressed against a central area of the dry resist layer 11 and heated to laminate the peripheral MEMS walls 23 to the surface of the resist layer 11. Next the Mylar disk is peeled away to release the level photoresist layer portion 24 to the walls 23 as a roof portion, forming an ink reservoir 25 spacing the MEMS layer 22 from the photoresist layer portion 24.

As illustrated by FIG. 5, the photoresist layer portion 24 is aligned with a negative mask 26 and exposed to light of sufficient intensity to crosslink and cure the epoxy novolak polymer, after which the unexposed, uncured areas are developed with γ-butyrolactone and rinsed with isopropyl alcohol to form nozzle areas 27 having a semi-parabolic cross-section.

A highly functionalized glycidylepoxy-derivatized bis phenol-A novolak resin compounded with a photoacid-generating catalyst is an ideal negative resist for fabrication of fluidic pathways in the present ink nozzle layers. This material can be spin cast onto a release surface such as a Mylar film 10 as in FIG. 1, and pre-baked in an oven to remove solvent and form a dry, semi-solid, adhesive resist layer 11.

The preferred photoresist solution is made by addition of about 63 parts by weight of an epoxy polymer of the formula

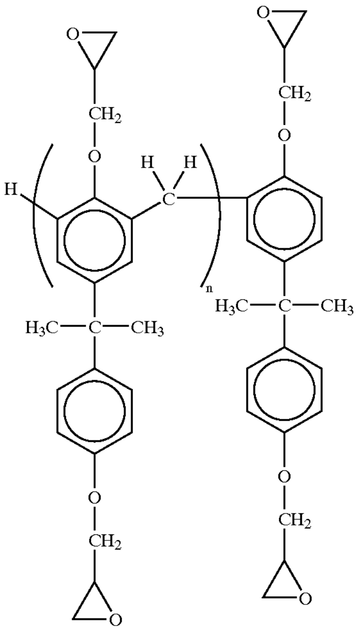

wherein n has an average value of 3 to about 20 parts by weight of γ-butyrolactone containing about 13 or 14 parts by weight triphenylsulfonium hexafluoroantimonate solution (supplied commercially as CYRACURE® UVI-6976 (obtained from Union Carbide) in a solution of 50 weight percent mixed triarylsulfonium hexafluoroantimonate in propylene carbonate). The resist-coated Mylar film is heated (soft baked) in an oven for between 15 and 25 minutes at 70° C. After cooling to 25° C. over 5 minutes, the soft baked resist layer 11 formed on the Mylar support film 10 was placed in surface contact with the surface of a channel wafer 12, and heat and pressure are applied to laminate the photoresist layer 11 to the surface of the channel wafer 12. Next, the Mylar support 10 is easily peeled away from the laminate to provide the resist-coated wafer 13. Then the level resist coating 14 on the wafer 12 is covered with a filter-forming negative mask and exposed to the full arc of a super-high pressure mercury bulb, amounting to from about 25 to about 500 milliJoules per square centimeter as measured at 365 nanometers. The exposed wafer is then heated at from about 70 to about 95° C. for from about 10 to about 20 minutes post-exposure bake, followed by cooling to 25° C. over 5 minutes. The uncured areas of the resist coating are developed with γ-butyrolactone, washed with isopropanol, and then dried at about 70° C. for about 2 minutes to form the filter-coated wafer 16 shown in FIG. 3 having a channel/nozzle layer 17, shown in FIG. 2, containing tapered, parabolic cross-section channels and nozzles 20 having narrow filter inlets 18 which exclude the entry of ink contaminants to the channels and nozzles on the surface of the channel wafer 12.

Any suitable roofshooter printhead configuration comprising actuator wafers having ink-bearing passages terminating in nozzles on the printhead surface can be formed with the materials disclosed herein to form a printhead of the present invention. The printheads of the present invention are of 'roofshooter' configuration.

The present nozzleplate layer 17 is formed by crosslinking the precursor polymer which is a phenolic novolac resin having glycidyl ether functional groups on the monomer repeat units thereof, The glycidyl ether functional groups generally are situated at the locations of the former hydrogen atoms on the phenolic hydroxy groups, Examples of suitable backbone monomers for the phenolic novolac resin include phenol, of the formula

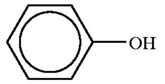

wherein the resulting glycidyl ether functionalized novolac resin includes structures of the formula

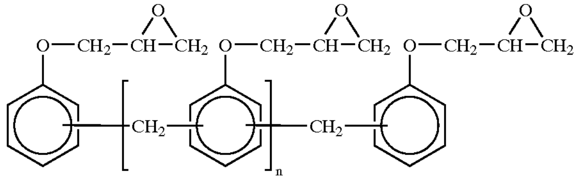

as well as branched structures thereof, o-cresol and p-cresol, of the formula

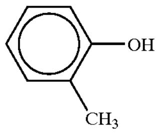

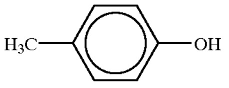

wherein the resulting glycidyl ether functionalized novolac resin includes structures of the formula

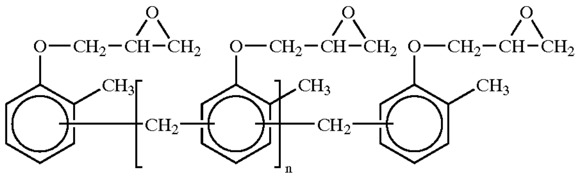

and

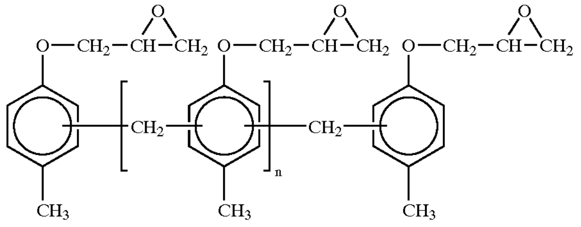

as well as branched structures thereof, bisphenol-A, of the formula

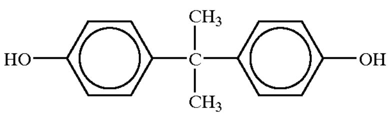

wherein the resulting glycidyl ether functionalized novolac resin includes structures of the formula

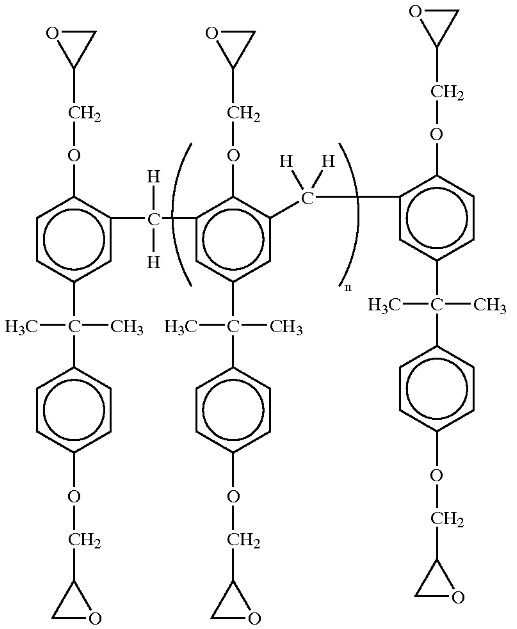

and

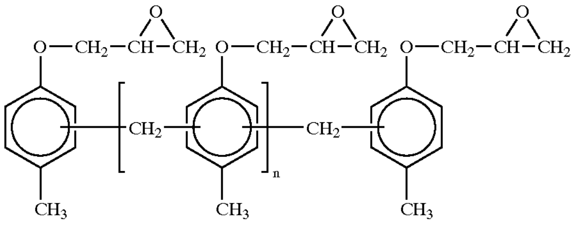

as well as randomized and branched structures thereof, and the like. The average number of repeat monomer units typically is from about 1 to about 20, and preferably is about 2, although the value of n can be outside of this range. One particularly preferred polymer is of the formula

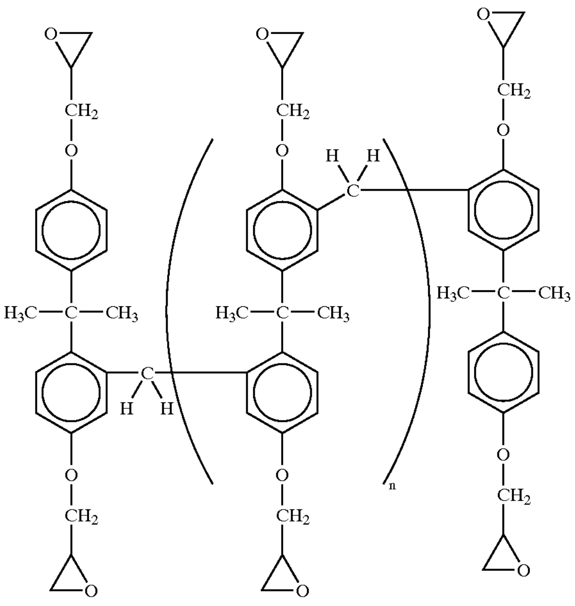

wherein n is an integer representing the average number of repeating monomer units and typically is from about 2 to about 20, and preferably is about 3, although the value of n can be outside of this range. Another particularly preferred polymer is of the formula

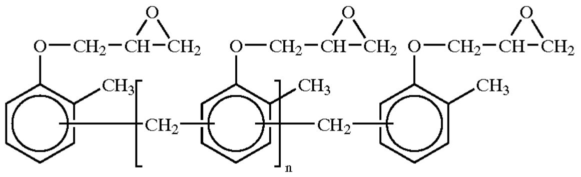

wherein n is an integer representing the average number of repeating monomer units and typically is from about 1 to about 20, and preferably is about 2, although the value of n can be outside of this range. Polymers of the formula

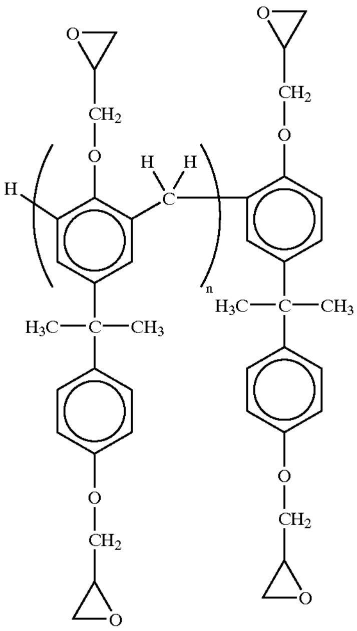

wherein n has an average value of about 3 are commercially available from, for example, Shell Resins, Resolution Performance Products, Houston, Tex. as EPON® SU-8. Commercial photoresists containing this polymer, a solvent, and a cationic initiator are also available from MicroChem Corporation, Newton, Mass. and from Sotec Microsystems, Switzerland. This type of photoresist is also disclosed in, for example, U.S. Pat. Nos. 4,624,912 and 4,882,245, the disclosure of which is totally incorporated herein by reference. Polymers of the formula

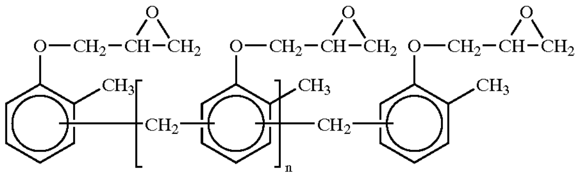

wherein n has an average value of about 3 are commercially available from, for example, Shell Resins, Resolution Performance Products, Houston, Tex. as EPON® DPS-164. Suitable photoresists of the general formulae set forth hereinabove are also available from, for example, Dow Chemical Co., Midland, Mich.

The nozzleplate layer 17 containing the crosslinked epoxy polymer is prepared by applying to the intermediate film 10 a photoresist layer 11 containing the uncrosslinked precursor epoxy polymer, an optional solvent for the precursor polymer, a cationic photoinitiator, and an optional sensitizer. The solvent and precursor polymer typically are present in relative amounts of from 0 to about 99 percent by weight solvent and from about 1 to 100 percent precursor polymer, preferably are present in relative amounts of from about 5 to about 60 percent by weight solvent and from about 40 to about 95 percent by weight polymer, and more preferably are present in relative amounts of from about 5 to about 40 percent by weight solvent and from about 60 to about 95 percent by weight polymer, although the relative amounts can be outside these ranges. Examples of suitable solvents include γ-butyrolactone, propylene glycol methyl ether acetate, tetrahydrofuran, methyl ethyl ketone, methyl isobutyl ketone, mixtures thereof, and the like.

Sensitizers absorb light energy and facilitate the transfer of energy to another compound, which can then form radical or ionic initiators to react to crosslink the precursor polymer. Sensitizers frequently expand the useful energy wavelength range for photoexposure, and typically are aromatic light absorbing chromophores. Sensitizers can also lead to the formation of photoinitiators, which can be free radical or ionic. When present, the optional sensitizer and the precursor polymer typically are present in relative amounts of from about 0.1 to about 20 percent by weight sensitizer and from about 80 to about 99.9 percent by weight precursor polymer, and preferably are present in relative amounts of from about 1 to about 20 percent by weight sensitizer and from about 80 to about 99 percent by weight precursor polymer. although the relative amounts can be outside these ranges.

Photoinitiators generally generate ions or free radicals which initiate polymerization upon exposure to actinic radiation. When present, the optional photoinitiator and the precursor polymer typically are present in relative amounts of from about 0.1 to about 20 percent by weight photoinitiator (in its pure form; not accounting for any solvent in which it may be commercially supplied) and from about 80 to about 99.9 percent by weight precursor polymer, and preferably are present in relative amounts of from about 1 to about 20 percent by weight photoinitiator and from about 80 to about 99 percent by weight precursor polymer, although the relative amounts can be outside these ranges.

A single material can also function as both a sensitizer and 25 a photoinitiator.

Further background material on initiators is disclosed in, for example, Ober et al., *J. M. S.—Pure App!. Chem.*, A30 (12), 877–897 (1993); G. E. Green, B. P. Stark, and S. A. Zahir, "Photocrosslinkable Resin Systems," *J. Macro. Sci.—Revs, Macro. Chem.*, C21(2), 187 (1981); H. F. Gruber, "Photoinitiators for Free Radical Polymerization~" *Prog!Polym. Sci.*, Vol. 17, 953 (1992); Johann G. Kloosterboer, "Network Formation by Chain Crosslinking Photopolymerization and Its Applications in Electronics," *Advances in Polymer Science,* 89, Springer-Verlag Berlin Heidelberg (1988); and "Diaryliodonium Salts as Thermal Initiators of Cationic Polymerization," J. V. Crivello, T. P. Lockhart, and J. L. Lee, J, of *Polymer Science. Polymer Chemistry Edition* 21 97 (1983), the disclosures of each of which are totally incorporated herein by reference. Sensitizers are available from, for example, Aldrich Chemical Co., Milwaukee, Wis., First Chemical Corporation, Pascagoula, Miss., and Pfaltz and Bauer, Waterberry, Conn. Aromatic ketones, including benzophenone and its derivatives, thioxanthone, camphor quinone, and the like can function as photosensitizers. Additional examples of suitable photoinitiators include onium salts of Group VA elements, onium salts of Group VIA elements, such as sulfonium salts, and aromatic halonium salts, such as aromatic iodonium salts. Specific examples of sulfonium salts include triphenylsulfonium tetrafluoroborate, methyldiphenylsulfonium tetrafluoroborate, dimethylphenylsulfonium hexafluorophosphate, triphenylsulfonium hexafluorophosphate, triphenylsulfonium hexafluoroantimonate, diphenylnaphthylsulfonium hexafluoroarsenate, tritolysulfonium hexafluorophosphate, anisyldiphenylsulfonium hexafluoroantimonate, 4-butoxyphenyldiphenylsulfonium tetrafluoroborate, 4-chlorophenyldiphenylsulfonium hexafluoroantimonate, tris(4-phenoxyphenyl)sulfonium hexafluorophosphate, di(4-ethoxyphenyl)methyulfonium hexafluoroarsenate, 4-acetoxy-phenyldiphenylsulfonium tetrafluoroborate, tris (4-thiomethoxyphenyl)Sulfonium hexafluorophosphate, di(methoxysulfonylphenyl)methylsulfonium hexafluoroantimonate, di(methoxynapththyl)methylSulfonium tetrafluoroborate, di(carbomethoxyphenyl)methylsulfonium hexafluorophosphate, 4~acetamidophenyldiphenylsulfonium tetrafluoroborate, dimethylnaphthylsulfonium hexafiuorophosphate, trifluoromethyldiphenylsulfonium tetrafluoroborate, methyl(n-methylphenothiazinyl)Sulfonium hexafluoroantimonclte, phenylmethylbenzylsulfonium-hexafluorophosphate, and the like.

Specific examples of aromatic iodonium salts include diphenyliodonium tetrafluoroborate, di(4-methylphenyl)iodonium tetrafluoroborate, phenyl-4-methylphenyliodonium tetrafluoroborate di(4-heptylphenyl)iodonium tetrafluoroborate, di(3-nitrophenyl)iodonium hexafluorophosphate, di(3-nitrophenyl)iodonium hexafluorophosphate, di(4-chlorophenyl)iodonium hexafluorophosphate, di(naphthyl) iodonium tetrafluroborate, di(4-trifluoromethylphenyl) iodonium tetrafluoroborate, diphenyliodonium hexafluorophosphate, di(4-methylphenyl)iodonium hexafluorophosphate, diphenyliodonium hexafluoroarsenate, di(4-phenoxyphenyl)iodonium tetrafluoroborate, phenyl-2-thienyliodonium hexafluorophosphate, 3,5-dimethylpyrazolyl-4-phenyliodonium hexafluorophosphate, diphenyliodonium hexafluoroantimonate, 2,2'-diphenyliodonium tetrafluoroborate, di(2,4-dichlorophenyl)iodonium hexafluorophosphate, di(4-bromophenyl)iodonium hexafluorophosphate, di(4-methoxyphenyl)iodonium hexafluorophosphate, di(3-carboxyphenyl)iodonium hexafluorophosphate, di(3-methoxycarbonylphenyl)iodonium hexafluorophosphate, di(3-methoxysulfonylphenyl)iodonium hexafluorophosphate, di(4-acetamidophenyl)iodonium hexafluorophosphate, di(2-benzoethienyl)iodonium hexafluorophosphate, and the like. Triarylsulfonium and diaryliodonium salts are examples of typical cationic photoinitiators. Aromatic onium salts of Group VIA elements, such as triarylsulfonium salts, are particularly preferred photoinitiators for the present invention; initiators of this type are disclosed in, for example, U.S. Pat. No. 4,058,401 and U.S. Pat. No. 4,245,029, the disclosures of each of which are totally incorporated herein by reference. Particularly preferred for the present invention are triphenylsulfonium hexafluoroantimonate and the like.

While the printheads of the present invention can be prepared with photoresist solutions containing only the precursor polymer, cationic initiator, and optional solvent, other optional ingredients can also be contained in the photoresist. For example, diluents can be employed if desired. Examples of suitable diluents include epoxy-substituted polyarylene ethers, such as those disclosed in U.S. Pat. No. 5,945,253, the disclosure of which is totally incorporated herein by reference, bisphenol-A epoxy materials, such as those disclosed as (nonpatternable) adhesives) in U.S. Pat. No. 5,762,812, the disclosure of which is totally incorporated herein by reference, having typical numbers of repeat monomer units of from about 1 to about 20, although the number of repeat monomer units can be outside of this range, and the like. Diluents can be present in the photoresist in any desired or effective amount, typically at least about 1 part by weight per 1 part by weight precursor polymer, and typically no more than about 70 parts by weight per one part by weight precursor polymer, preferably no more than about 10 parts by weight per one part by weight precursor polymer, and more preferably no more than about 5 parts by weight per one part by weight precursor polymer, although the relative amounts can be outside of these ranges.

The printheads of the present invention can be prepared with high aspect ratios and straight sidewalls. Nozzles as small as 5 microns wide can be easily resolved in 28 micron thick films exposed at, for example 200 to 500 millijoules per square centimeter (typically plus or minus about 50 millijoules per square centimeter, preferably plus or minus about 25 millijoules per square centimeter) (aspect ratio of 5.6). It is possible to develop processing conditions enabling a variety of shapes, angles or amounts of concavity. Preferred exposures can vary depending on the cationic initiator employed, the presence or absence of a diluent, relative humidity, and the like. These results easily enable high jet densities; jet densities typically are at least about 300 dots per inch, preferably at least about 600 dots per inch, and more preferably at least about 1,200 dots per inch, although the jet density can be outside of these ranges. Scanning electron microscopy micrographs indicate a topographically level surface devoid of detrimental lips or dips.

Specific embodiments of the invention will now be described in detail. These examples are intended to be illustrative, and the invention is not limited to the materials, conditions, or process parameters set forth in these embodiments. All parts and percentages are by weight unless otherwise indicated.

EXAMPLE I

Resist Solution Preparation

A resist solution was prepared by jar 33 grams of γ-butyrolactone (obtained from Aldrich Chemical Co., Milwaukee. Wisc.) and 23.3 CYRACURE® UVI-6976(containing 50 percent by weight triphenysulfonium hexafluoroantimonate in propylene carbonate, obtained from Union Carbide) Thereafter, 115 grams of EPON® SU-8 epoxy polymer of the formula

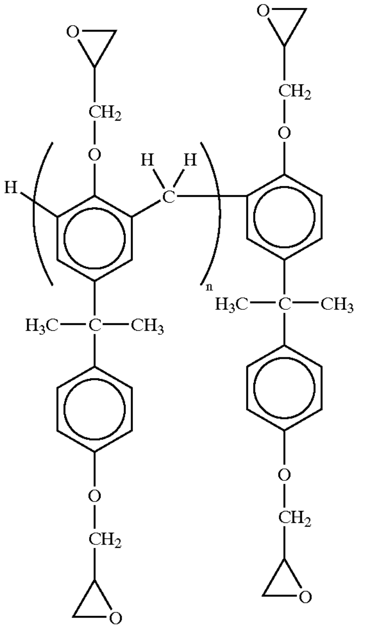

wherein n has an average value of 3 (obtained from Shell Resins) was added to the jar and the solution was mixed on a STONEWARE® roller for about one week prior to use.

A commercial resist solution of EPON SU-8 was also obtained from MicroChem Corporation Newton, Mass., and was used as received. This commercial solution is of similar composition to the one prepared as described, more specifically, accordingly to the MSDS sheet for this product, the commercial solution contained between 25 and 50 percent by weight γbutyrolactone, between 1 and 5 percent by weight of a mixed triarylsulfonium hexafluoroantimonate salt (sulfonium(thiodi-4,1-phenylene)bis(diphenylbis((OC-6-11)hexafluoroanti monate(1-)), CAS 89452-37-9, and p-thiophenoxyphenyldlphenysulfonium hexafluoroantimonate, CAS 71449-78-0) in propylene carbonate, and between 50 and 75 percent by weight of the epoxy resin.

Transfer Substrate Preparation

A thin transparent film, preferably a 1–2 mil film of Mylar (polyethylene terephthalate), has applied thereto 3 to 4 grams of the resist solution followed by spin coating on a Headway Research Inc. PWM 101 spin coater at 2000 to 4000 rpm for 20 seconds. The resulting film coating was soft baked in a circulating air oven at 70° for 20 minutes.

Laminate Preparation

Round blank silicon wafers, the top levels of which contained oxide or bare silicon were cleaned in a bath containing 75 percent by weight sulfuric acid and 25 percent by weight hydrogen peroxide at a temperature of 120° C. The wafers were heated on a hot plate at 70° C. for 2 minutes prior to lamination to the soft baked photoresist layer on the Mylar transfer substrate. Two methods were employed to increase contact between the dry resist layer on the Mylar disc and the silicon substrate. The first includes stacking 10 blank silicon wafers on top of the Mylar composite while in the oven. The second method includes rolling a steel mandrel back and forth over the Mylar surface before the composite has an opportunity to cool. The Mylar release layer can be removed easily after the composite has equilibrated to room temperature. Both released films and unreleased films were then photo-exposed and processed according to normal procedures where both types of films yielded clean defect free nozzle structures (FIG. 3). The cylindrical or conical structures are approximately 10–30 μm in width and are dependent upon the mask, film thickness, and processing conditions. It was also possible to photo-expose the resist using Mylar as the substrate and in this manner clean defect free nozzle features were also achieved. With appropriate release materials the resist can be separated free from the Mylar substrate yielding a freestanding plastic ink nozzle sheet.

Photoexposure and Processing

The wafers containing the soft-baked resist films laminated thereon were exposed through a chromium mask to the actinic radiation of an exposure aligner unit until the required dose had been delivered to the film. Exposure was effected with two different tools: (a) a CANON®PLA-501FA unit with a 250 Watt Ushio super-high pressure mercury lamp (model 250D) as the light source; (b) a KARL SUSS®MA 150 unit with a 350 Watt Ushio super high pressure mercury lamp (model 350DS) as the light source. The light intensity was about 6 to 10 milliwatts per square centimeter for each unit measured at 365 nonometers. Both exposure stations were operated on contact printing mode and the light intensity was measured at 365 nonometers. Light intensity for exposure with the CANON®PLA-501FA unit was performed using a UVP model UVX digital radiometer: the KARL SUSS® MA 150 unit had a built-in internal radiometer. All wafers were subjected to a post-exposure bake for 15 to 20 minutes at 70 to 95° C. in a circulating air oven directly after exposure. Subsequent to the post-exposure bake, the latent images were exposed to development with γ-butyrolactone (obtained from Aldrich Chemical Co.), followed by rinsing with isopropanol.

RESULTS

Overall, clean, well-resolved nozzleplates with passages of parabolic cross-section, with diameters between about 15 and 20 microns at the exposed surface and between 20 and 25 microns at the wafer surface and film thicknesses of about 30 microns were resolved. Nearly identical results were obtained with the resist solution mixed as indicated above and the commercial resist solution obtained from MicroChem Corporation.

Other embodiments and modifications of the present invention may occur to those of ordinary skill in the art subsequent to a review of the information presented herein; these embodiments and modifications, as well as equivalents thereof, are also included within the scope of this invention.

What is claimed is:

1. A process for forming an ink jet printhead which comprises:

(a) providing a lower substrate in which one surface thereof has an array of drop generating elements and addressing electrodes having terminal ends formed thereon;

(b) depositing onto the release surface of an intermediate film support by spin-coating, to form a coating having a peripheral bead, a photopatternable layer comprising a precursor polymer of a phenolic novolac resin capable of being soft baked to a dry semi-solid, adhesive condition;

(c) prebaking the photopatternable layer to said dry, semi-solid, adhesive condition;

(d) laminating the dry, semi-solid adhesive layer to said one surface of the lower substrate where the surface of the lower substrate has a surface area diameter less than that of the peripheral bead so as to laminate and transfer a planar portion of the spin-coated layer to the lower substrate under heat and pressure and separating it from the release surface of the intermediate film support;

(e) exposing the photopatternable layer to actinic radiation in an imagewise pattern corresponding to ink nozzles and developing to form a nozzle plate section, and (f) removing the precursor polymer from the unexposed areas, thereby forming ink nozzle recesses which are aligned to communicate with the drop generating elements and terminal ends of the electrodes of the lower substrate laminated thereto, step (e) being carried out either before or after step (d).

2. A process according to claim 1 wherein the precursor polymer of step b) is a phenolic novolac resin having glycidyl ether functional groups on the monomer repeat units thereof.

3. A process according to claim 1 wherein step (b) is carried out by coating onto the release surface of the intermediate support a composition comprising the precursor polymer and a solvent selected from γbutyrolactone, propylene glycol methyl ether acetate, tetrahydrofuran, methyl ethyl ketone, methyl isobutyl ketone, or mixtures thereof.

4. A process according to claim 1 which comprises exposing the photopatternable layer in step (e) while it is still present on the release surface of the intermediate film, support.

5. A process according to claim 1 in which the film support is transparent and exposure is conducted through the film support.

6. A process according to claim 1 in which the formed ink nozzles are contoured to provide constricted nozzle dimensions.

7. A process according to claim 1 in which the lower substrate is a MEMS wafer having peripheral topography and the lamination step (d) spaces the photopatternable layer above the MEMS surface to produce an ink reservoir therebetween.

8. A process according to claim 1 in which the process steps are repeated in order to form multiple layers of photopatterned semisolid polymer that form fluidic passageways.

9. A process according to claim 8 in which the photopatterned semisolid polymer layers vary in thickness and fluidic passageway volume, such that large cavities are formed in thick layers, and small cavities are toned in thin layers.

* * * * *